United States Patent
Park et al.

(10) Patent No.: US 10,440,649 B2
(45) Date of Patent: Oct. 8, 2019

(54) METHOD FOR PERFORMING POWER MANAGEMENT IN WIRELESS LAN SYSTEM AND WIRELESS DEVICE USING THE SAME

(71) Applicant: LG ELECTRONICS INC., Seoul (KR)

(72) Inventors: Hyunhee Park, Seoul (KR); Kiseon Ryu, Seoul (KR); Suhwook Kim, Seoul (KR); Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/785,247

(22) Filed: Oct. 16, 2017

(65) Prior Publication Data
US 2018/0192372 A1   Jul. 5, 2018

Related U.S. Application Data

(60) Provisional application No. 62/441,453, filed on Jan. 2, 2017.

(51) Int. Cl.
*H04W 52/02* (2009.01)
*H04W 84/12* (2009.01)
(Continued)

(52) U.S. Cl.
CPC ......... *H04W 52/0229* (2013.01); *H04L 43/10* (2013.01); *H04W 40/244* (2013.01);
(Continued)

(58) Field of Classification Search
CPC ......... H04W 52/0229; H04W 72/0413; H04W 84/12; H04W 40/244; Y02D 70/14;
(Continued)

(56) References Cited

U.S. PATENT DOCUMENTS

2005/0249227 A1* 11/2005 Wang .................. H04L 47/10
                                                       370/412
2007/0211745 A1*  9/2007 Deshpande .......... H04L 12/12
                                                       370/432
(Continued)

OTHER PUBLICATIONS

LAN/MAN Standards Committee, "Draft Standard for Information Technology—Telecommunications and information exchange between systems Local and metropolitan area networks—Specific requirements, Part 11: Wireless LAN Medium Access Control (MAC) and Physical Layer (PHY) Specifications", doc.: IEEE P802.11ah/D8.0, Apr. 2016, 655 pages.
(Continued)

*Primary Examiner* — Tejis Daya
(74) *Attorney, Agent, or Firm* — Lee, Hong, Degerman, Kang & Waimey

(57) ABSTRACT

Disclosed herein is a method for performing power management in a wireless LAN system and a wireless device using the same, wherein the method may include the steps of receiving, by a first wireless device, a beacon frame including a first time wake time (TWT) flow identifier (TWT FID) indicating a type of first recommendation frame authorized to be transmitted during a first TWT service period and a second TWT flow identifier (TWT FID) indicating a type of second recommendation frame authorized to be transmitted during a second TWT service period, from a second wireless device, after receiving the beacon frame, shifting, by the first wireless device, from an awake state to a doze state, and receiving, by the first wireless device, a change frame for changing the second TWT flow identifier during the first TWT service period from the second wireless device.

10 Claims, 19 Drawing Sheets

(51) Int. Cl.
　　*H04W 40/24* 　　(2009.01)
　　*H04W 72/04* 　　(2009.01)
　　*H04L 12/26* 　　(2006.01)

(52) U.S. Cl.
　　CPC ........ *H04W 72/0413* (2013.01); *H04W 84/12* (2013.01); *Y02D 70/00* (2018.01); *Y02D 70/10* (2018.01); *Y02D 70/14* (2018.01); *Y02D 70/142* (2018.01); *Y02D 70/22* (2018.01)

(58) Field of Classification Search
　　CPC ........ Y02D 70/00; Y02D 70/22; Y02D 70/10; Y02D 70/142; H04L 43/10
　　See application file for complete search history.

(56) References Cited

U.S. PATENT DOCUMENTS

| | | | | |
|---|---|---|---|---|
| 2013/0188541 A1* | 7/2013 | Fischer | ................. | H04W 72/06 |
| | | | | 370/311 |
| 2014/0161010 A1* | 6/2014 | Merlin | .............. | H04W 52/0235 |
| | | | | 370/311 |
| 2016/0219510 A1* | 7/2016 | Asterjadhi | ........ | H04W 52/0274 |
| 2016/0269993 A1* | 9/2016 | Ghosh | ............... | H04W 52/0229 |

OTHER PUBLICATIONS

LAN/MAN Standards Committee, "Draft Standard for Information Technology—Telecommunications and information exchange between systems Local and metropolitan area networks—Specific requirements", doc.: IEEE P802.11-REVmc/D8.0, Aug. 2016, 3775 pages.

LAN/MAN Standards Committee, "Draft Standard for Information Technology—Telecommunications and information exchange between systems Local and metropolitan area networks—Specific requirements—Amendment 6: Enhancements for High Efficiency WLAN", doc.: IEEE P802.11ax/D1.0, Nov. 2016, 453 pages.

* cited by examiner

FIG. 1
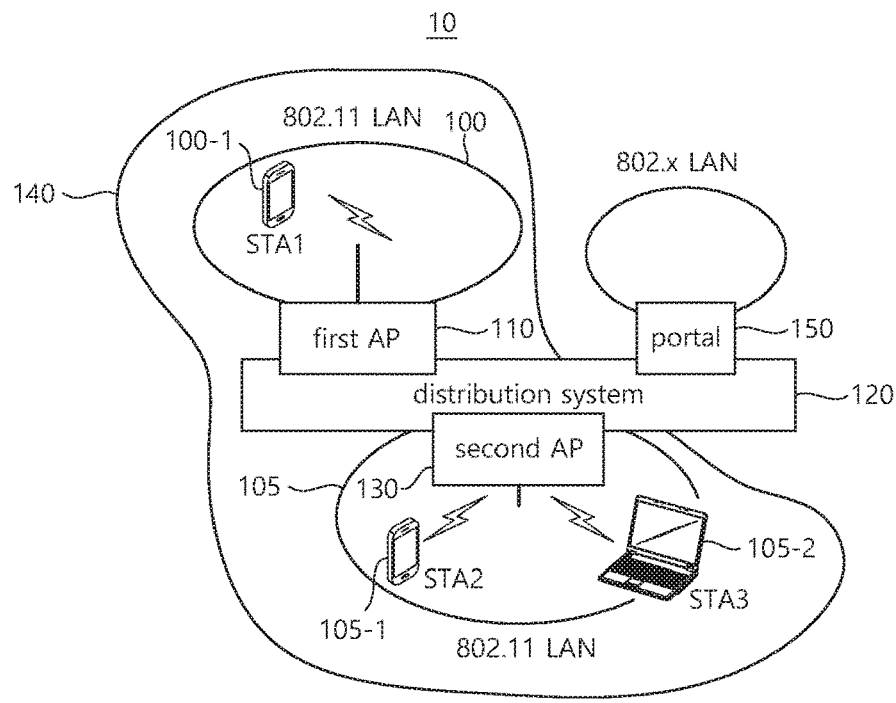
(A)
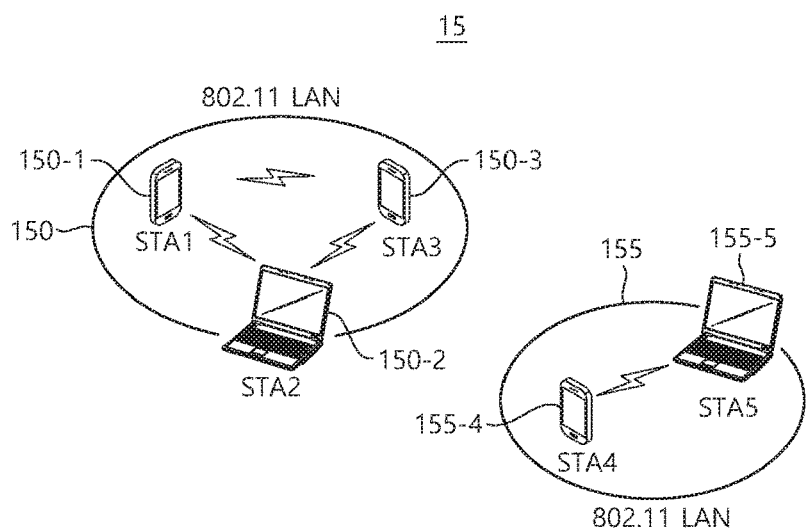
(B)

FIG. 7

| | | | | | | | | |
|---|---|---|---|---|---|---|---|---|
| 700 | 710 | 720 | 730 | 740 | 750 | 760 | 770 | |
| L-STF | L-LTF | L-SIG | HE-SIG A | HE-SIG B | HE-STF | HE-LTF | Data | first frequency band (781) |
| L-STF | L-LTF | L-SIG | HE-SIG A | HE-SIG B | HE-STF | HE-LTF | Data | second frequency band (782) |
| L-STF | L-LTF | L-SIG | HE-SIG A | HE-SIG B | HE-STF | HE-LTF | Data | third frequency band (783) |
| L-STF | L-LTF | L-SIG | HE-SIG A | HE-SIG B | HE-STF | HE-LTF | Data | fourth frequency band (784) |

4-time FFT

METHOD FOR PERFORMING POWER MANAGEMENT IN WIRELESS LAN SYSTEM AND WIRELESS DEVICE USING THE SAME

CROSS-REFERENCE TO RELATED APPLICATION

Pursuant to 35 U.S.C. § 119(e), this application claims the benefit of U.S. Provisional Patent Application No. 62/441,453, filed on Jan. 2, 2017, the contents of which are hereby incorporated by reference herein in its entirety.

TECHNICAL FIELD

The present invention relates to wireless communication and, most particularly, to a method for performing power management in a wireless LAN system and a wireless device using the same.

BACKGROUND

A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment in which an interference source exists, a dense heterogeneous network environment, and an environment in which a high user load exists.

In the next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in the existing WLAN.

Specifically, scenarios for a wireless office, a smart home, a stadium, a hotspot, and the like receive attention in the next-generation WLAN. Discussions are ongoing on improvement in the performance of a WLAN system in the dense environment including a large number of APs and STAs based on relevant scenarios.

SUMMARY OF THE INVENTION

This specification relates to a method for performing power management in a wireless LAN system and a wireless device using the same. Herein, the method for performing power management in a wireless LAN system may include the steps of receiving, by a first wireless device, a beacon frame including a first time wake time (TWT) flow identifier (TWT FID) indicating a type of first recommendation frame authorized to be transmitted during a first TWT service period and a second TWT flow identifier (TWT FID) indicating a type of second recommendation frame authorized to be transmitted during a second TWT service period, from a second wireless device, after receiving the beacon frame, shifting, by the first wireless device, from an awake state to a doze state, and receiving, by the first wireless device, a change frame for changing the second TWT flow identifier during the first TWT service period from the second wireless device.

BRIEF DESCRIPTION OF THE DRAWINGS

FIG. 1 is a conceptual view illustrating the structure of a wireless local area network.

FIG. 7 is a diagram illustrating another example of the HE PPDU.

DESCRIPTION OF EXEMPLARY EMBODIMENTS

Figure 2:
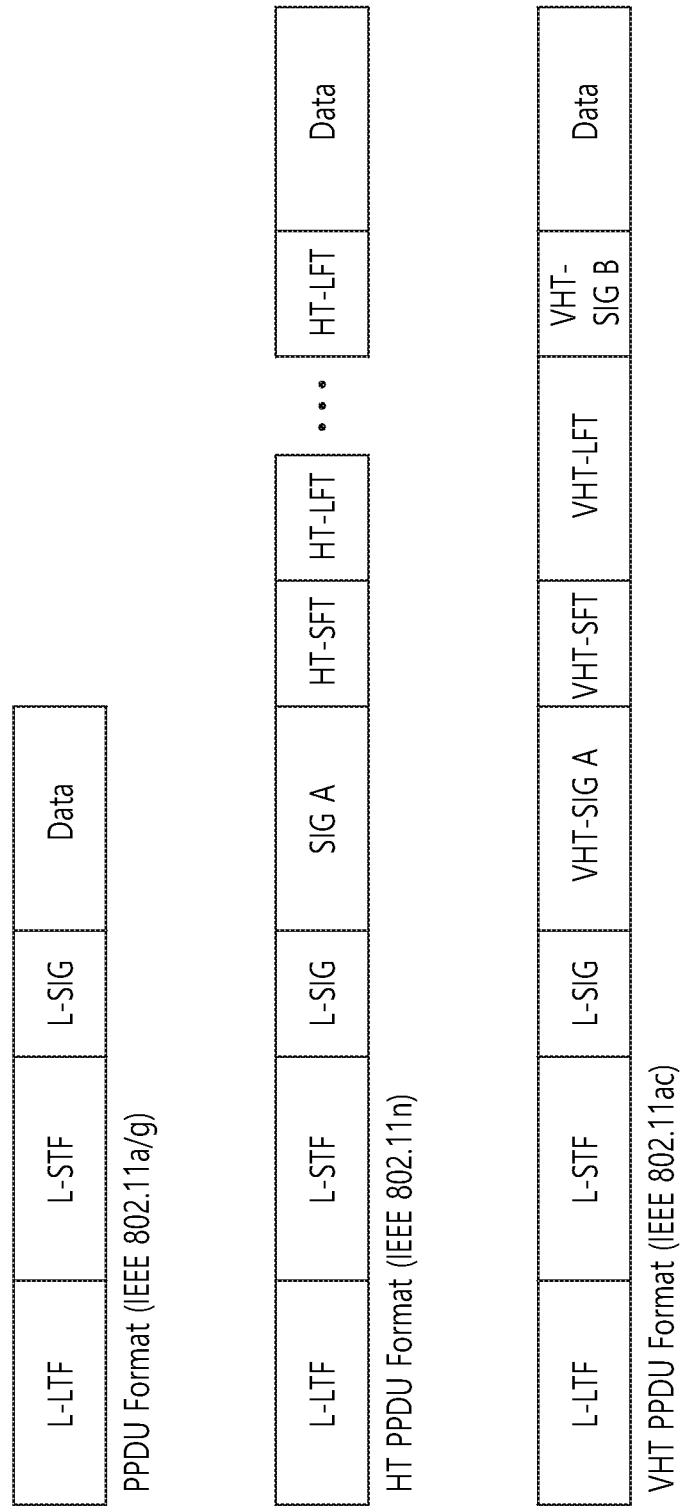
FIG. 2 is a diagram illustrating an example of a PPDU used in an IEEE standard.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also include complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network (WLAN). FIG. 1 (A) illustrates the structure of an infrastructure basic service set (BSS) of institute of electrical and electronic engineers (IEEE) 802.11.

Referring the FIG. 1 (A), the wireless LAN system 10 of the FIG. 1 (A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, the BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1 (A), a network between the APs 110 and 130 and a network between the APs 110 and 130 and the STAs 100-1, 105-1, and 105-2 may be implemented.

FIG. 1 (B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1 (B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
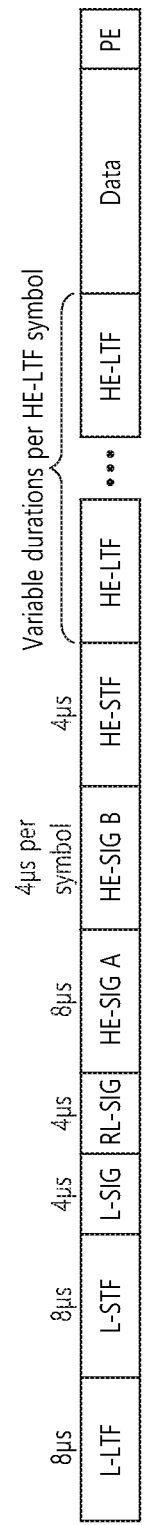
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
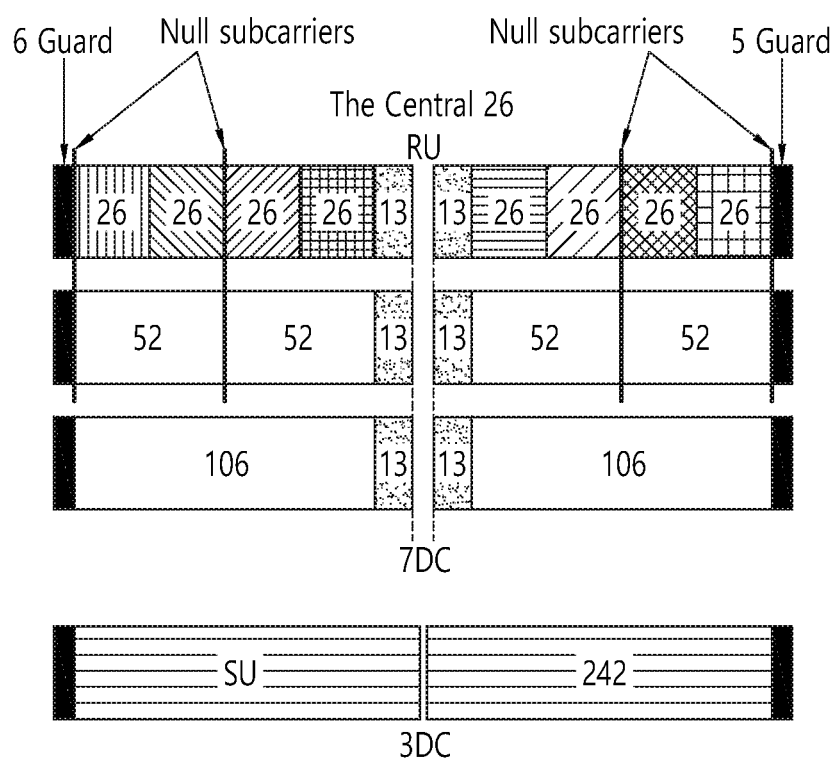
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
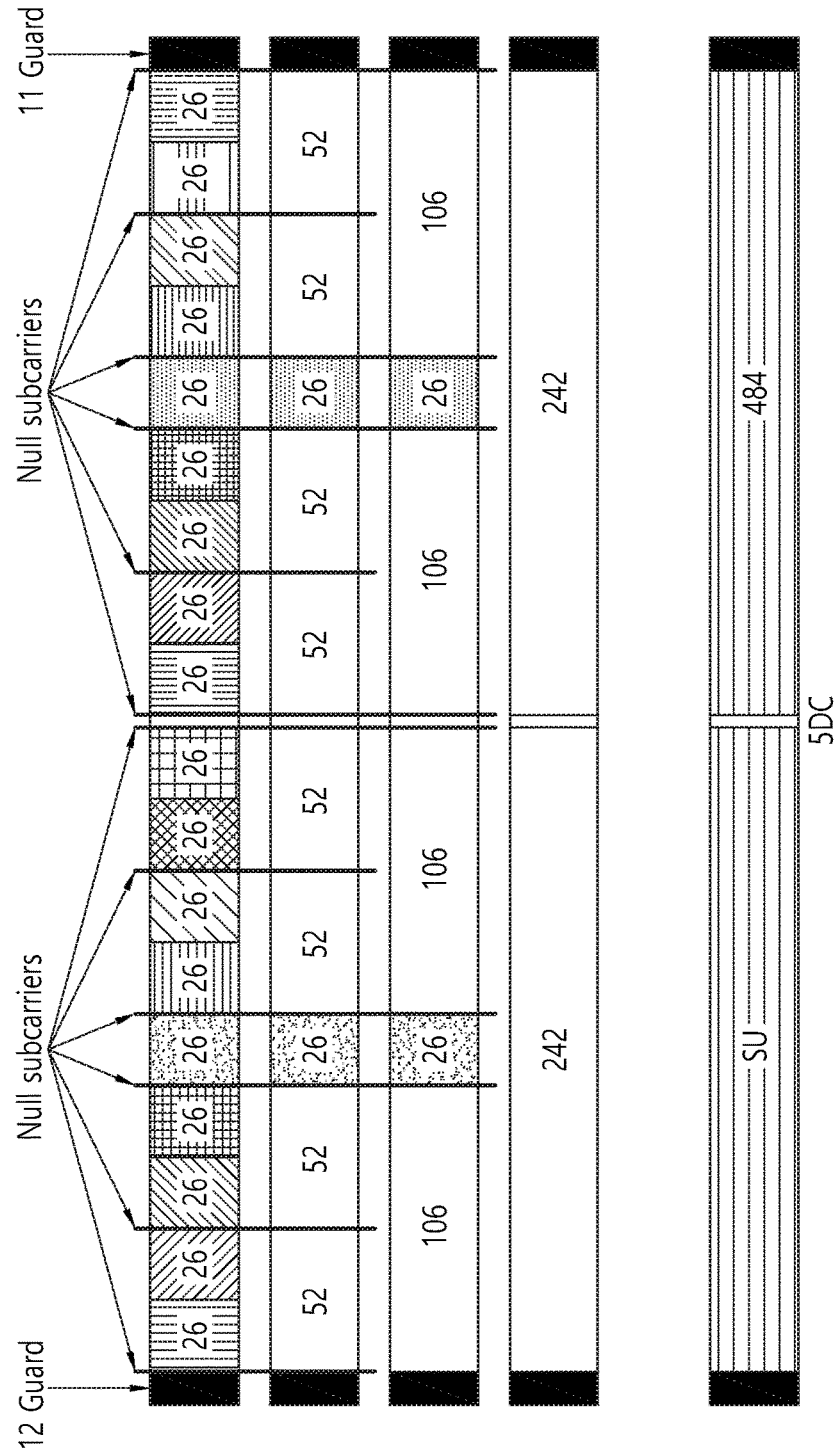
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
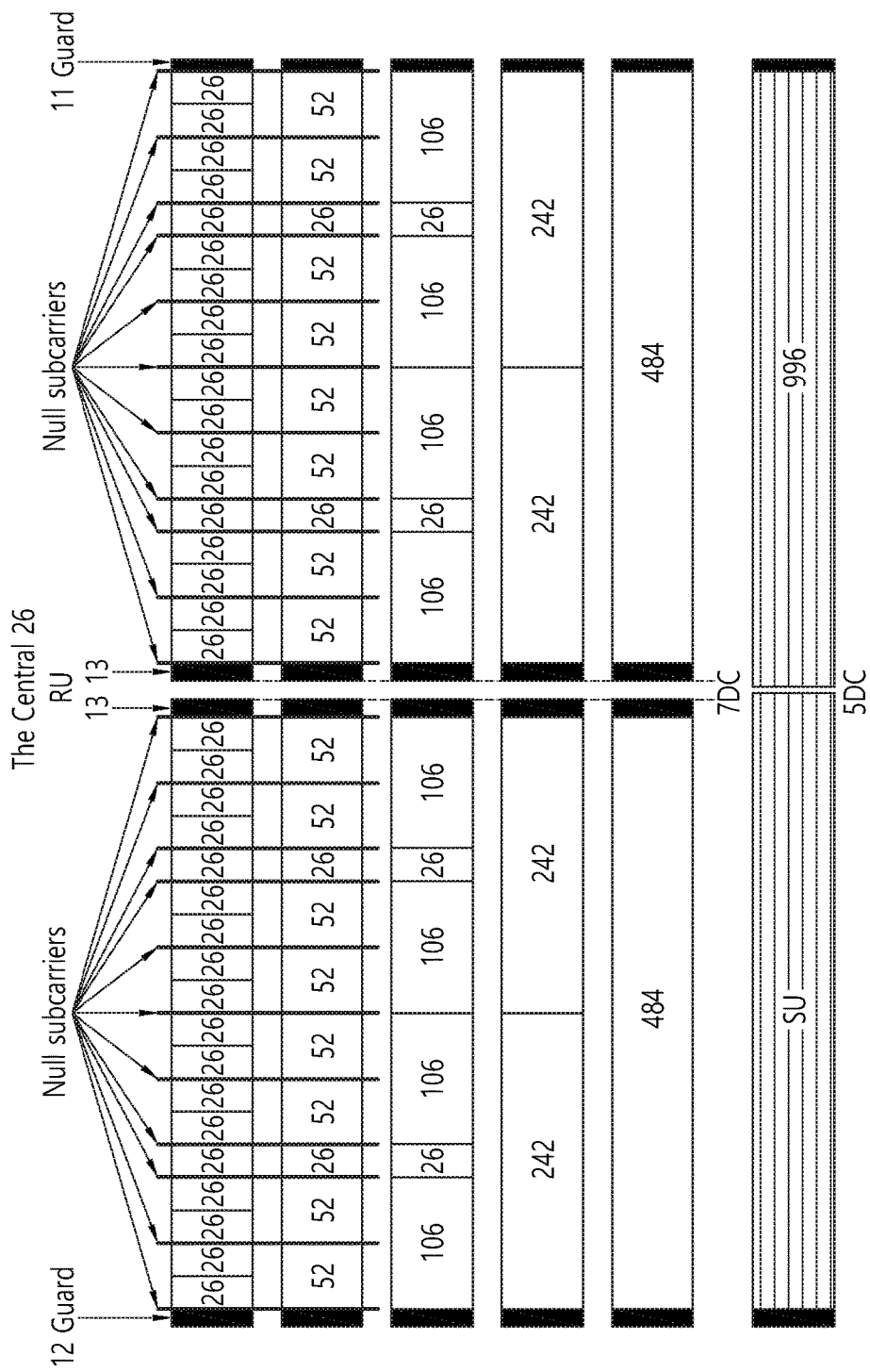
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a term called downlink data (alternatively, a downlink frame), and data (alternatively, a frame) which the STA transmits to the AP may be expressed as a term called uplink data (alternatively, an uplink frame).

Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
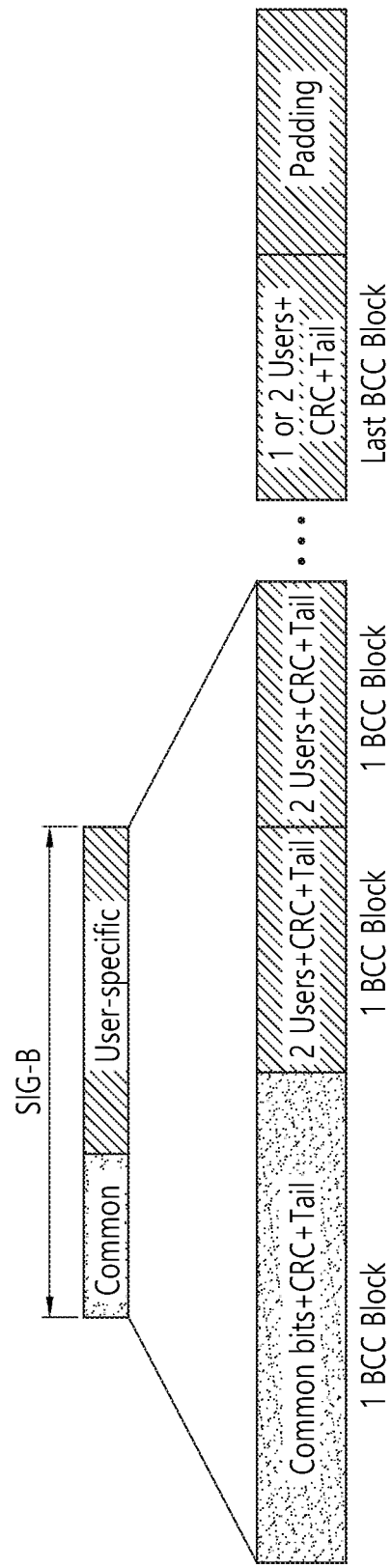
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
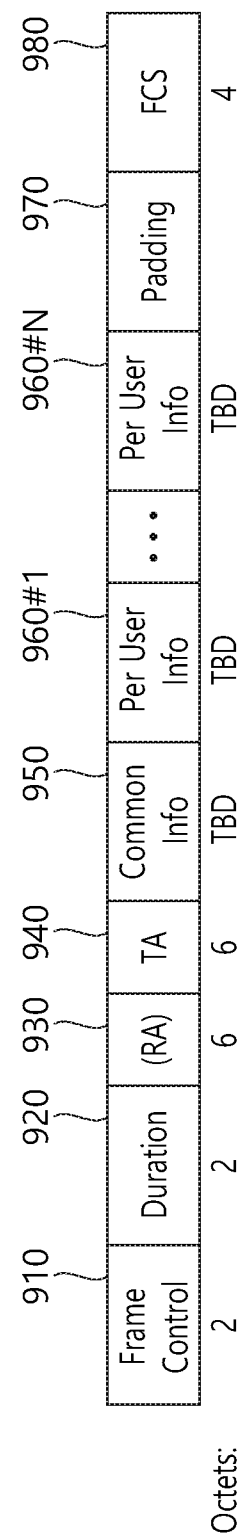
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
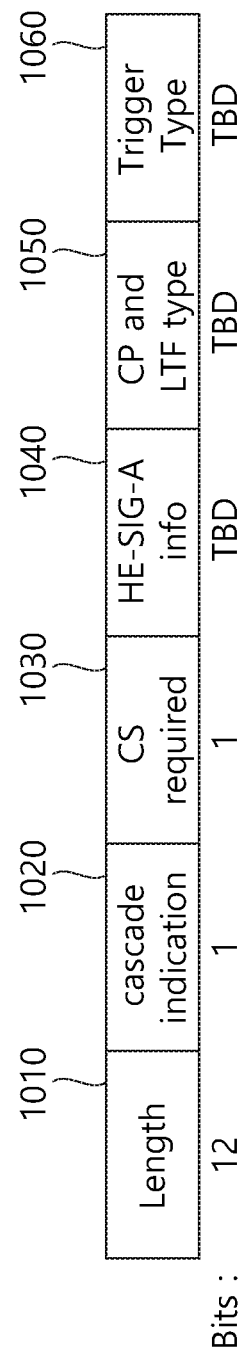
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
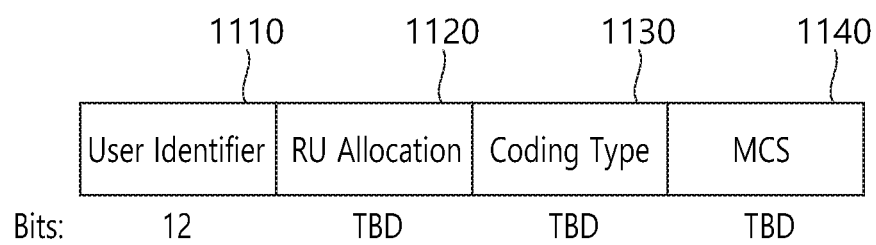
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

In the present specification, the user identifier field of FIG. 11 may be referred to as an association identifier (hereinafter, AID) field.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

For example, when BCC coding is applied to the uplink PPDU, the coding type field 1130 may be set to '1', and when the LDPC coding is applied, the coding type field 1130 may be set to '0'.

Figure 12:
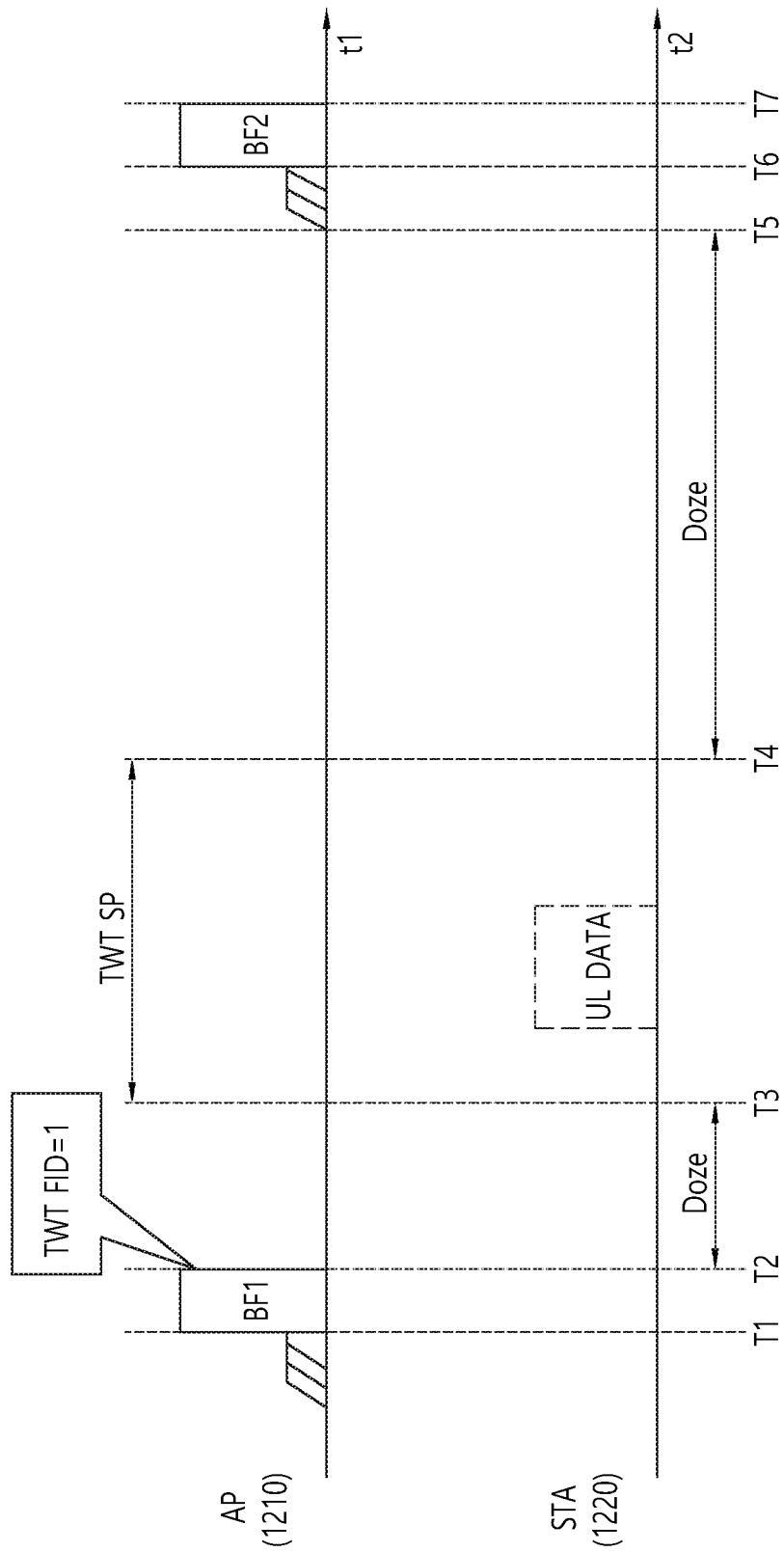
FIG. 12 illustrates an example showing a method for performing power management in a wireless LAN system.

FIG. 12 illustrates an example showing a method for performing power management in a wireless LAN system.

Hereinafter, it will be assumed that the AP and the STA, which are mentioned in this specification, perform contention based Enhanced Distributed Channel Access (EDCA) operation. The EDCA operation, which is mentioned in this specification, may be understood by referring to the description disclosed in Section 10.22.2.2 of the standard document IEEE 802.11 REVmc/D8.0.

According to the present invention, the AP may periodically transmit a beacon frame (hereinafter referred to as 'BF'). For example, a cycle of the beacon frame (BF) may be equal to 100 milliseconds (ms). The beacon frame in this specification may be transmitted based on a broadcast scheme.

According to the exemplary embodiment of the present invention, a time interval between beacon frames (BF1 and BF2) that are periodically transmitted may be referred to as a beacon interval. For example, the time interval T1 to T6 between a first beacon frame BF1 and a second beacon frame BF2 shown in FIG. 12 may be referred to as a first beacon interval.

In the exemplary embodiment of the present invention, the beacon frame may include diverse elements as disclosed in Section 9.3.3.3 of the standard document IEEE 802.11 REVmc/D8.0.

Furthermore, the beacon frame of this specification may include a TWT element, which is disclosed in Section 9.4.200 of the standard document IEEE 802.1 lax/D1.0. The detailed description of the TWT element, which is included in the beacon frame will be presented later on with reference to the accompanying drawing.

In the exemplary embodiment of the present invention, it may be assumed that the STA operates in a Power Save mode (hereinafter referred to as 'PS mode'). More specifically, the STA operating in the PS mode may be in an awake state or a doze state. In other words, the STA operating in the PS mode may be shifted (or transitioned) from the awake state to the doze state or may be shifted (or transitioned) from the doze state to the awake state.

For example, the STA operating in the awake state may transmit a frame to the AP or may receive frame from the AP. Conversely, the STA operating in the doze state is incapable of transmitting a frame to the AP and is also incapable of receiving a frame from the AP.

Generally, in order to reduce power consumption, the STA operating in the PS mode may shift from the awake state to the doze state after receiving a beacon frame and may maintain the doze state during the beacon interval. More specifically, the STA operating in the PS mode may maintain the doze state until before the reception of a next (or subsequent) beacon frame.

Additionally, the STA operating in the PS mode may shift to the awake state during a specific section (or period) within the beacon interval. The STA is capable of receiving data buffered by the AP or transmitting data buffered by the STA to the AP.

In the exemplary embodiment of the present invention, a time section (or time period) during which the STA is in the awake state may be referred to as a Target Awake Time (hereinafter referred to as 'TWT') service period or a broadcast TWT service period. During the beacon interval, a time period that does not correspond to the TWT service period may be referred to as a TWT non-service period during which the STA is in the awake state.

Referring to FIG. 1 to FIG. 12, a horizontal axis of the AP 1210 may indicate time t1 in the perspective of the AP, and a vertical axis of the AP 1210 may be related to the presence or absence of a frame that is being transmitted by the AP 1210. A horizontal axis of the STA 1220 may indicate time t2 in the perspective of the STA, and a vertical axis of the STA 1220 may be related to the presence or absence of a frame that is being transmitted by the STA 1220.

The AP 1210 and the STA 1220 may perform an EDCA based channel contention in order to acquire a transmission opportunity (hereinafter referred to as 'TXOP') for the channel. Although it is not shown in FIG. 12, this specification will not be limited only to a case when only one STA exists, and, therefore, it should be understood that the exemplary embodiment may also be applied to a plurality of STAs and APs.

During the first period T1 to T2, the AP 1210 that has succeeded in the channel contention may acquire the TXOP. The AP 1210 may transmit the first beacon frame BF1. The first beacon frame, which is transmitted during the first period T1 to T2, may include a TWT element.

More specifically, the TWT element included in the first beacon frame BF1 of FIG. 12 may include a TWT parameter set for the TWT service period.

For example, the TWT parameter set may include start time information of a TWT service period for the TWT service period, duration information of the TWT service period, and interval information of the TWT service period, in case a plurality of TWT service periods exist in the beacon interval.

In this specification, the TWT parameter set for the TWT non-service period may not be included in the beacon frame. A time period excluding at least one TWT service period being supported by at least one TWT parameter set within a beacon interval of one cycle may be understood as the TWT Non-Service Period.

A recommendation frame according to the exemplary embodiment of the present invention may be understood as a frame that can be transmitted by the AP or STA during the TWT service period.

An authorized group according to the exemplary embodiment of the present invention may indicate types of recommendation frames. The AP or STA according to the exemplary embodiment of the present invention may transmit or receive only the recommendation frame in accordance with the authorized group within the TWT service period.

The beacon frame in this specification may include a TWT flow identifier (hereinafter referred to as 'TWT FID') indicating the authorized group. For example, the TWT flow identifier (TWT FID) may be configured to indicate any one of a first authorized group to a third authorized group.

For example, the TWT flow identifier (TWT FID) may be configured to have any one of a first value to a third value (0, 1, and 2, in case of Table 1). An example of the TWT flow identifier (TWT FID) in this specification may be configured as shown below in Table 1.

TABLE 1

| TWT Flow Identifier field value | Description when transmitted in a broadcast TWT element |
|---|---|
| 0 | No constraints on the frames transmitted during a broadcast TWT SP. |
| 1 | Frames transmitted during a broadcast TWT SP are recommended to be limited to: PS-Poll, CQI, QoS Null with buffer status, Sounding Feedback, Management Action. Trigger frames transmitted by the AP during the broadcast TWT SP do not contain RUs for random access. |
| 2 | Frames transmitted during a broadcast TWT SP are recommended to be limited to: PS-Poll, CQI, QoS Null with buffer status, Sounding Feedback, Management Action, (Re) Association Request. |

TABLE 1-continued

| TWT Flow Identifier field value | Description when transmitted in a broadcast TWT element |
|---|---|
| | Trigger frames transmitted by the AP during the broadcast TWT SP contain at least one RU for random access. |
| 3-7 | Reserved |

Referring to Table 1, the authorized group may be divided into three different groups in accordance with the TWT flow identifier (TWT FID).

The first authorized group corresponds to a case when the TWT flow identifier (TWT FID) is equal to '0'. For example, when the STA receives a beacon frame having a TWT flow identifier (TWT FID) that is equal to '0', the STA may transmit all types of frames without any limitation (or constraint) in the frames that may be transmitted during the TWT service period.

The second authorized group corresponds to a case when the TWT flow identifier (TWT FID) is equal to '1'. For example, when the STA receives a beacon frame having a TWT flow identifier (TWT FID) that is equal to '1', the STA may transmit a Power-Save Poll frame, a Quality of Service (QoS) null frame, a frame related to sounding feedback, and a management frame during the TWT service period.

When the TWT flow identifier (TWT FID) is set to '1', the AP may not transmit a trigger frame including at least one Resource Unit for random access for a random access procedure.

More specifically, the STA that has received the beacon frame having its TWT flow identifier (TWT FID) set to '1' may not transmit a frame that is related to random access. A more detailed description of the random access procedure is disclosed in Section 27.5.2.6.2 of the standard document IEEE 802.11 ax/D1.0.

The third authorized group corresponds to a case when the TWT flow identifier (TWT FID) is equal to '2'. For example, when the STA receives a beacon frame having a TWT flow identifier (TWT FID) that is equal to '2', the STA may transmit a Power-Save Poll frame, a Quality of Service (QoS) null frame, a frame related to sounding feedback, and a management frame during the TWT service period.

When the TWT flow identifier (TWT FID) is set to '2', the AP may transmit a trigger frame including at least one Resource Unit for random access for the random access procedure. More specifically, the STA that has received the beacon frame having its TWT flow identifier (TWT FID) set to '2' may transmit a frame that is related to random access.

Referring to FIG. 12, it will be assumed that the TWT flow identifier (TWT FID) of the first beacon frame BF1 of the first period T1 to T2 is set to '1'.

In the first period T1 to T2, the STA 1220 operating in the awake state may receive the first beacon frame BF1. The STA 1220 may operate based on the plurality of elements included in the first beacon frame BF1.

The STA 1220 may acquire information on a start point of the TWT service period (TWT SP) and information on a duration of the TWT SP based on the TWT parameter set included in the first beacon frame BF1.

The STA 1220 may acquire information on the types of frames, i.e., the authorized group of recommendation frames that may be transmitted by the STA 1220 to the AP (e.g., a case when the TWT FID is set to '1') during the TWT service period (TWT SP) based on the TWT flow identifier (TWT FID) included in the first beacon frame BF1.

At a start point T2 of a second period T2 to T3, the STA 1220 may shift from the awake state to the doze state. The STA 1220 may maintain its doze state during the second period T2 to T3.

At a start point T3 of the TWT service period (TWT SP) according to the TWT parameter set, the STA 1220 may shift from the doze state to the awake state. The STA 1220 may maintain its awake state during the TWT service period (TWT SP) T3 to T4.

The STA 1220 may determine whether or not an uplink frame for the AP corresponds to a transmittable recommendation frame that may be transmitted during the TWT service period (TWT SP). For example, the uplink frame of FIG. 12 may correspond to a data frame.

Based upon the result of determining whether or not the uplink frame for the AP 1210 corresponds to a recommendation frame, the transmission or non-transmission of the corresponding uplink frame may be determined.

The STA 1220 may perform an Enhanced distributed channel access (EDCA) backoff procedure during the TWT service period (TWT SP). In case there are no constraints in the frames being transmitted by the STA in accordance with the TWT flow identifier (TWT FID) (e.g., in case the TWT FID is set to '0'), the STA that has completed the EDCA backoff operation may transmit the uplink frame.

In case of FIG. 12, constraints on the types of frames being transmitted by the STA exist in accordance with the above-described assumption (wherein the TWT FID of the BF1 is set to '1'). More specifically, the STA 1220 may determine that the uplink frame (e.g., data frame) for the AP 1210 does not correspond to a recommendation frame according to Table 1.

Therefore, the STA 1220 may not transmit an uplink frame during the TWT service period (TWT SP).

In FIG. 12, although it is described that the procedure performed by the STA for determining whether or not the uplink frame corresponds to a recommendation frame and the procedure performed by the STA for determining whether or not to transmit the uplink frame in accordance with the determined result are performed during the third period T3 to T4, this is merely exemplary. And, therefore, it shall be understood that the above-described procedures may also be performed in other periods (e.g., T1 to T2, T2 to T3).

At a start point T4 of a fourth period T4 to T5, the STA 1220 may shift from the awake state to the doze state. The STA 1220 may maintain its doze state during the fourth period T4 to T5. The fourth period T4 to T5 of FIG. 12 may also be referred to as a TWT non-service period (TWT non-SP).

After the first beacon interval T1 to T6 has elapsed, the STA 1220 may be shifted ack to the awake state at a start point of a second beacon interval for a second beacon frame BF2. It shall be understood that the above-described operations are also repeated during the next (or subsequent) beacon interval (i.e., second beacon interval).

Referring to FIG. 12, when constraints exist in accordance with the TWT flow identifier (i.e., when the TWT FID is set to '1' or '2'), it shall be understood that this exemplary embodiment may be applied in a situation where conflict occurs between an uplink frame, which is buffered to the STA for the AP, and the existing constraints according to the TWT flow identifier (TWT FID).

Figure 13:
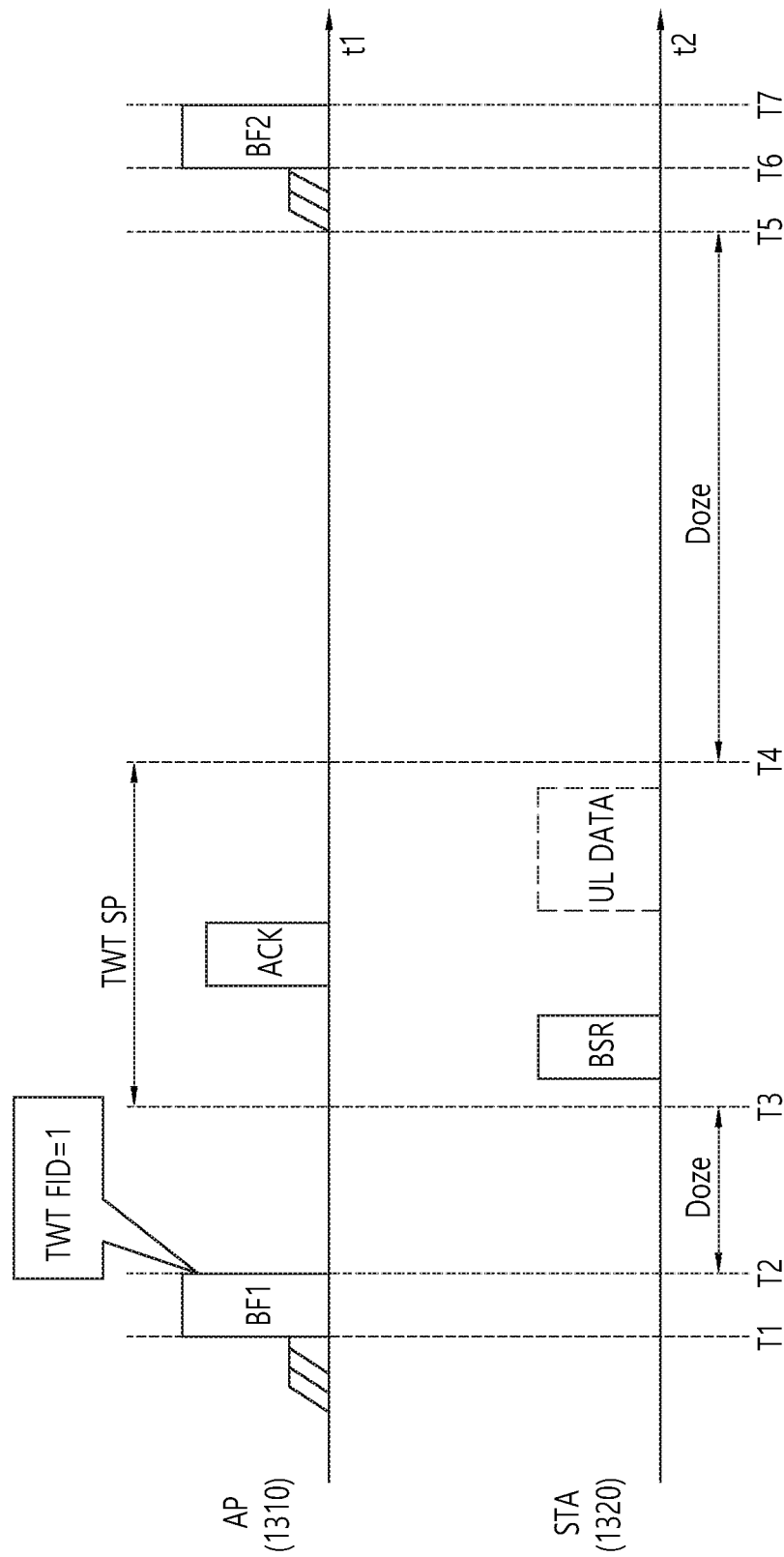
FIG. 13 illustrates another example showing a method for performing power management in a wireless LAN system.

FIG. 13 illustrates another example showing a method for performing power management in a wireless LAN system. Referring to FIG. 12 and FIG. 13, it shall be understood that the description on the first period T1 to T2 and the second period T2 to T3 shown in FIG. 12 may be substituted for the description on a first period T1 to T2 and a second period T2 to T3 shown in FIG. 13.

In a third period T3 to T4 of FIG. 13, the STA 1320 may transmit a Buffer Status Report (BSR) frame to the AP 1310. Herein, the third period T3 to T4 of FIG. 13 may also be referred to as a TWT service period (TWT SP).

The Buffer Status Report (BSR) frame may be understood as a frame correspond to a Quality of Service (QoS) Null frame having buffer status information included in its header or a QoS data frame having buffer status information included in its header. A more detailed description of the Buffer Status Report (BSR) frame is disclosed in Section 9.2.4.6.4.5 of the standard document IEEE 802.1 1ax/D1.0.

The STA 1320 may determine the Buffer Status Report (BSR) frame as a recommendation frame based on Table 1. More specifically, when it is assumed that the TWT flow identifier (TWT FID) of FIG. 13 is set to '1', the STA 1320 may transmit the Buffer Status Report (BSR) frame to the AP 1310.

Referring to FIG. 13 and Table 1, it shall be understood that all frames excluding a trigger frame for random access (i.e., a frame having its AID assigned with '0') correspond to frames that can be transmitted to the STA 1320 by the AP 1310 during the TWT service period (TWT SP) T3 to T4.

During the third period T3 to T4 of FIG. 13, the AP 1310 may transmit an acknowledgement (ACK) frame to the STA 1320 as a response to the Buffer Status Report (BSR) frame.

The STA 1320 may determine whether or not an uplink frame for the AP 1310 corresponds to a transmittable recommendation frame that may be transmitted during the TWT service period (TWT SP). More specifically, the STA 1320 may determine whether or not a data frame (UL DATA), which corresponds to an uplink frame for the AP 1310, is a recommendation frame.

In accordance with whether or not the uplink frame corresponds to a recommendation frame, the STA 1320 may determine whether or not to transmit the data frame (UL DATA) to the AP 1310.

According to the TWT flow identifier of FIG. 13 (when it is assumed that the TWT FID is set to '1'), the third period T3 to T4 may be understood as a period wherein constraints exist in the types of frames that can be transmitted by the STA.

The STA 1320 may determine that the uplink frame (e.g., data frame) for the AP 1310 does not correspond to a recommendation frame according to Table 1. Based upon the determined result, the STA 1320 may not transmit an uplink frame during the third period T3 to T4.

Additionally, the description of the operations of the AP 1310 and the STA 1320 during the periods (T4 to T5, T5 to T6, T6 to T7) following the third period T3 to T4 shown in FIG. 13 may be substituted with the detailed description of FIG. 12, which is provided above.

Although it is not shown in FIG. 13, a case when an ACK frame has failed to be received after transmitting the Buffer Status Report (BSR) frame during the third period T3 to T4 may be assumed. In this case, since the Buffer Status Report (BSR), which is to be re-transmitted by the STA, does not correspond to a frame having constraints based on Table 1, the Buffer Status Report (BSR) may be re-transmitted regardless of the given value of the TWT flow identifier (TWT FID).

Figure 14:
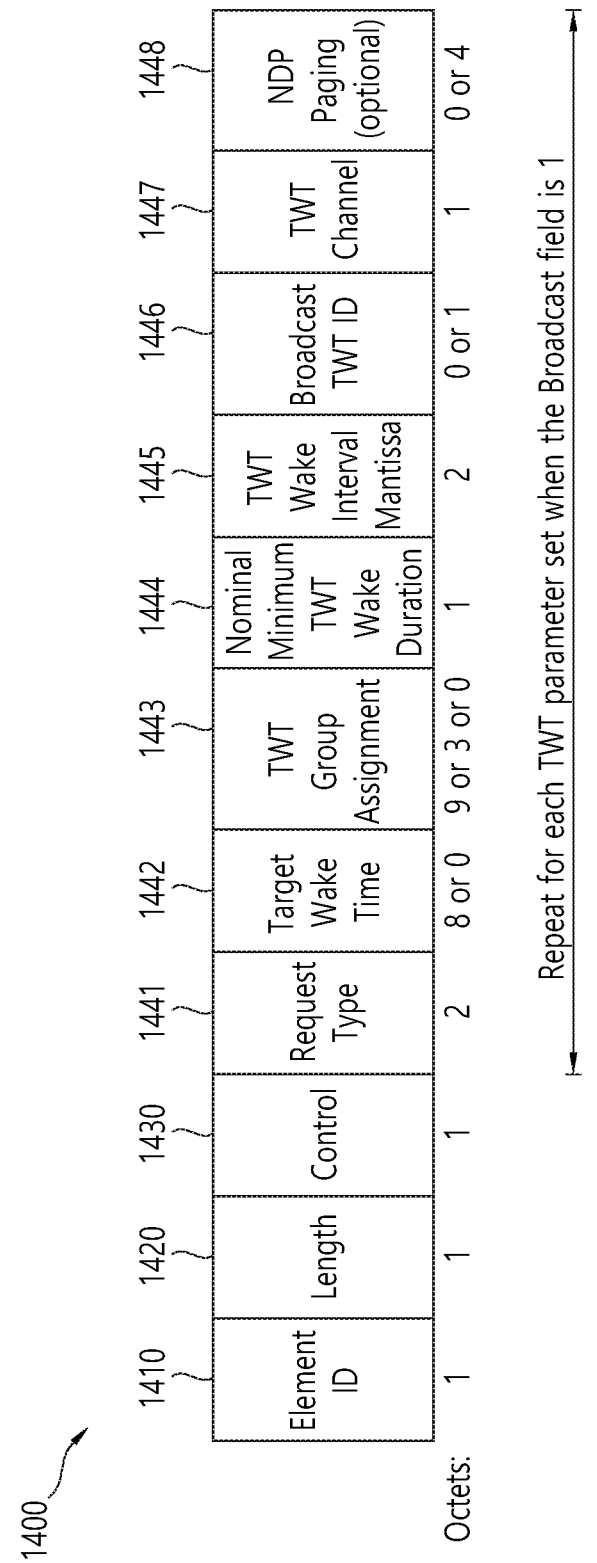
FIG. 14 illustrates a format of a TWT element that is included in a beacon frame according to an exemplary embodiment of the present invention.

FIG. 14 illustrates a format of a TWT element that is included in a beacon frame according to an exemplary embodiment of the present invention. Referring to FIG. 12 to FIG. 14, the TWT element 1400, which is individually included in the beacon frames BF1 and BF2 shown in FIG. 12 and FIG. 13, may include a plurality of fields 1410 to 1430 and 1441 to 1448.

1 octet may be allocated for an Element ID field 1410. The Element ID field 1410 may be configured to have a value indicating the TWT element 1400 among at least one set of element information included in the beacon frame.

1 octet may be allocated for a Length field 1420. The Length field 1420 may be configured to have a value indicating a total number of bits that are allocated for the TWT element.

1 octet may be allocated for a Control field 1430. The Control field 1430 may include an indicator indicating whether or not a TWT service period (TWT SP) according to the TWT element 1400 corresponds to a broadcast TWT period for a plurality of STAs.

Hereinafter, it will be assumed that an indicator indicating the broadcast TWT period is included in the control field 1430. The broadcast TWT period may refer to a time period according to a broadcast scheme for all user STAs receiving a beacon frame. When a broadcast TWT period is indicated (e.g., when the indicator is set to '1'), one or more TWT parameter sets 1441 to 1448 may be included in the TWT element 1400.

More specifically, when a plurality of broadcast TWT periods (e.g., first broadcast TWT period, a second broadcast TWT period) exist in a beacon interval, the TWT parameter set 1441 to 1448 may be repeatedly indicated in the TWT element 1400 as many times as the number of broadcast TWT periods.

For example, a first TWT parameter set following the format of the TWT parameter sets 1441 to 1448 may be allocated for the first broadcast TWT period. And, a second TWT parameter set following the format of the TWT parameter sets 1441 to 1448 may be allocated for the second broadcast TWT period.

2 octets may be allocated for a Request field 1441. Information on the TWT flow identifier (TWT FID) shown in Table 1, which is presented above, may be included in the Request field 1441.

When the broadcast TWT period is indicated, 8 octets may be allocated for a Target Wake Time field 1442. More specifically, information corresponding to a timing synchronization function (TSF) timer for waking an STA during a TWT service period for an STA, which has received the TWT element 1400, may be included in the Target Wake Time field 1442.

A TWT group assignment field 1443 may indicate group information of an STA, which is to receive the TWT element 1400. For example, when a broadcast TWT period is indicated in the TWT element 1400, the TWT group assignment field 1443 may not be allocated (or assigned).

1 octet may be allocated for a nominal minimum TWT wake duration field 1444. A value indicating the duration of a TWT service period (TWT SP) may be configured in the nominal minimum TWT wake duration field 1444.

2 octets may be allocated for a TWT wake interval mantissa field 1445. The TWT wake interval mantissa field 1445 may include information for calculating a TWT wake interval in accordance with a transmission point of a next (or subsequent) beacon frame.

A broadcast TWT ID field 1446 may include information for indicating a specific TWT service period (TWT SP) during which the STA requesting the TWT element 1400 is to participate. The broadcast TWT ID field 1446 may include information for indicating a specific TWT service period (TWT SP) during which the STA transmitting the TWT element 1400 provides a TWT parameter set.

A TWT channel field 1447 may include a bitmap for indicating which channel is being used as a temporary primary channel during the TWT service period (TWT SP).

An NDP paging field 1448 may be optionally included in the TWT element 1400.

Figure 15:
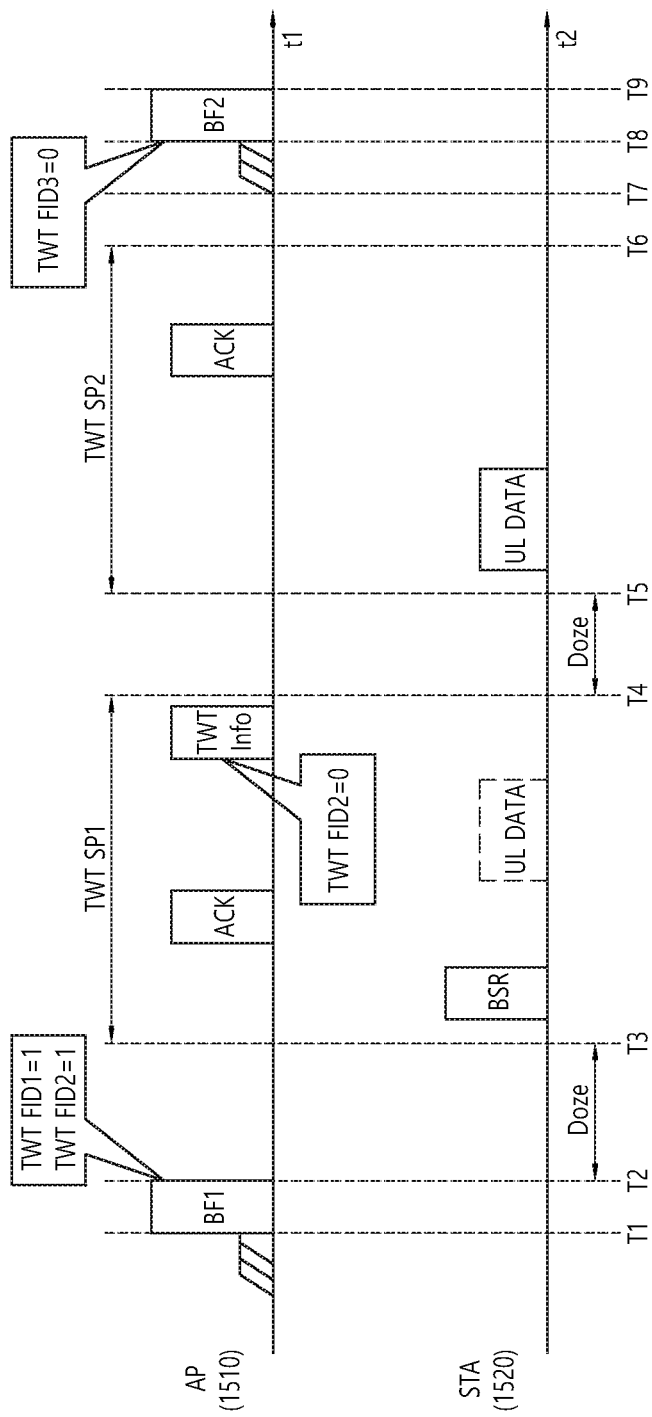
FIG. 15 illustrates an example showing a method for performing power management in a wireless LAN system according to an exemplary embodiment of the present invention.

FIG. 15 illustrates an example showing a method for performing power management in a wireless LAN system according to an exemplary embodiment of the present invention.

Referring to FIG. 12 to FIG. 15, a horizontal axis of the AP 1510 may indicate time t1 in the perspective of the AP, and a vertical axis of the AP 1510 may be related to the presence or absence of a frame that is being transmitted by the AP 1510. A horizontal axis of the STA 1520 may indicate time t2 in the perspective of the STA, and a vertical axis of the STA 1520 may be related to the presence or absence of a frame that is being transmitted by the STA 1520.

Referring to FIG. 1 to FIG. 15, FIG. 15 illustrates a case when a plurality of TWT flow identifiers (TWT FID1, TWT FID2) for a plurality of TWT service periods (TWT SP1, TWT SP2) within a beacon interval T1 to T8 are configured to have the same value (i.e., 1).

In a first period T1 to T2 of FIG. 15, both first and second TWT flow identifiers (TWT FID1, TWT FID2) included in the first beacon frame BF1, which is transmitted by the AP 1510, may be set to '1'.

In the first period T1 to T2 of FIG. 15, the STA 1520 may receive the first beacon frame BF1 in its awake state. The STA 1520 may operate based on the plurality of elements included in the received first beacon frame B1.

The STA 1520 may acquire information related to a plurality of service periods (TWT SP1, TWT SP2) based upon a plurality of TWT parameter sets included in the first beacon frame BF1.

For example, the STA 1520 may acquire start time information of a first TWT service period (TWT SP1), duration information of the first TWT service period (TWT SP1), and interval information of between the first TWT service period (TWT SP1) and its subsequent service period (i.e., TWT SP2) based on a first TWT parameter set.

Also, the STA 1520 may acquire start time information of a second TWT service period (TWT SP2), duration information of the second TWT service period (TWT SP2), and interval information of between the second TWT service period (TWT SP1) and its subsequent service period (none, in case of FIG. 15) based on a second TWT parameter set.

The STA 1520 may acquire information on the types of recommendation frame that can be transmitted during the first TWT service period (TWT SP1) (i.e., information on the authorized group) based on the first TWT flow identifier (TWT FID1).

Additionally, STA 1520 may acquire information on the types of recommendation frame that can be transmitted during the second TWT service period (TWT SP2) based on the second TWT flow identifier (TWT FID1), which is included in the first beacon frame BF1.

As described above, the types of frames that can be transmitted by the STA during the plurality of TWT service periods (TWT SP1 and TWT SP2) may be constrained in accordance with the first and second TWT flow identifiers (i.e., the TWT FID1 and the TWT FID2 are both set to '1').

At a start point T2 of a second period T2 to T3 shown in FIG. 15, the STA 1520 may shift from the awake state to the doze state. The STA 1520 may maintain its doze state during the second period T2 to T3.

At a start point T3 of the first TWT service period (TWT SP1) according to a first TWT parameter set, the STA 1520 may shift from the doze state to the awake state. The STA 1520 may maintain its awake state during the first TWT service period (TWT SP1) T3 to T4.

The STA 1520 may determine whether or not an uplink frame for the AP 1510 corresponds to a transmittable recommendation frame that may be transmitted during the TWT service period (TWT SP).

For example, the uplink frame may correspond to a data frame (UL DATA). Based on whether or not the uplink frame for the AP 1510 corresponds to a recommendation frame, the transmission or non-transmission of the corresponding uplink frame to the AP 1510 may be determined.

The STA 1520 may perform an Enhanced distributed channel access (EDCA) backoff procedure during the TWT service period (TWT SP). In case there are no constraints in the frames being transmitted by the STA in accordance with the TWT flow identifier (TWT FID) (e.g., in case the TWT FID is set to '0'), it shall be understood that the STA, which has completed the EDCA backoff operation, may transmit the uplink frame.

The STA 1520 may determine the Buffer Status Report (BSR) frame for notifying a queue size of the buffered data to the AP 1510 as a recommendation frame that can be transmitted during the TWT service period (TWT SP).

The STA 1520 may transmit the Buffer Status Report (BSR) frame during the first service period (TWT SP1). The STA 1520 may receive an ACK frame from the AP 1510 as a response to the Buffer Status Report (BSR) frame.

The STA 1520 may determine that the uplink frame (e.g., UL DATA) for the AP 1510 does not correspond to a recommendation frame according to Table 1.

Based on the determined result of the STA 1520, the STA 1520 according to the exemplary embodiment of the present invention is incapable of transmitting the uplink frame (e.g., UL DATA) during the first TWT service period (TWT SP1).

The AP 1510 according to the exemplary embodiment of the present invention may transmit a TWT information (TWT info) frame for dynamically changing the TWT flow identifier (TWT FID) corresponding to the subsequent (or next) TWT service period (TWT SP). The TWT info frame may correspond to a frame being transmitted from the AP when a specific situation (or condition) is satisfied.

As shown in FIG. 15, when information on a frame that is buffered by the STA (e.g., BSR information) is received, the AP may refer to the TWT flow identifier (TWT FID) of the current TWT service period so as to determine whether or not the frame buffered by the STA can be received.

When it is determined that the frame buffered for the STA cannot be received due to the constraints of the current TWT service period (TWT SP), the SP may transmit a TWT info frame for changing the TWT flow identifier (TWT FID) corresponding to the next TWT service period. The format structure of the TWT info frame will hereinafter be described in more detail with reference to the accompanying drawing.

The STA 1520, which has received the TWT info frame of FIG. 15 may update the TWT flow identifier (TWT FID) for the next TWT service period (i.e., TWT SP2) from its predetermined value '1' to '0' through a beacon frame (i.e., BF1).

Accordingly, the next TWT service period (i.e., TWT SP2) may be changed to a period that has no constraint on the type of transmittable frames.

More specifically, by changing the TWT flow identifier (TWT FID) for the next TWT service period (i.e., TWT SP2), the STA 1520 may transmit the buffered uplink frame (UL DATA) to the AP 1510 during the next service period (i.e., TWT SP2).

At an end point T4 of the first TWT service period (TWT SP1) T3 to T4, the STA may shift from the awake state to the doze state.

During a fourth period T4 to T5 shown in FIG. 15, the STA 1520 may maintain the doze state.

During a fifth period T5 to T6 shown in FIG. 15, the STA 1520 may transmit the uplink data frame (UL data) for the AP 1510. For example, the uplink data (UL data) frame may include a payload for the AP. The uplink data frame may correspond to a frame being transmitted through an EDCA procedure. The uplink data frame (UL data) may correspond to a QoS data frame.

During the fifth period T5 to T6 shown in FIG. 15, the AP 1510 may transmit an ACK frame for notifying the successful reception of the uplink data frame (UL data).

The STA 1520 of FIG. 15 may maintain its doze state during a sixth period T6 to T7 shown in FIG. 15.

During a seventh period T7 to T8 shown in FIG. 15, the AP 1510 and the STA 1520 may once again perform channel contention for acquiring the TXOP.

During a eighth period T8 to T9 shown in FIG. 15, a third TWT flow identifier (TWT FID3) for a third TWT service period (TWT SP3) (not shown) of a next beacon interval (not shown) corresponding to the second beacon frame BF2 may be set to '0'.

According to the exemplary embodiment of the present invention, power efficiency of the power saving operation performed by the wireless LAN system may be enhanced through the TWT info frame, which dynamically changes the TWT flow identifier (TWT FID) corresponding to the next TWT service period (TWT SP). Accordingly, a wireless LAN system having enhanced performance may be provided.

Figure 16:
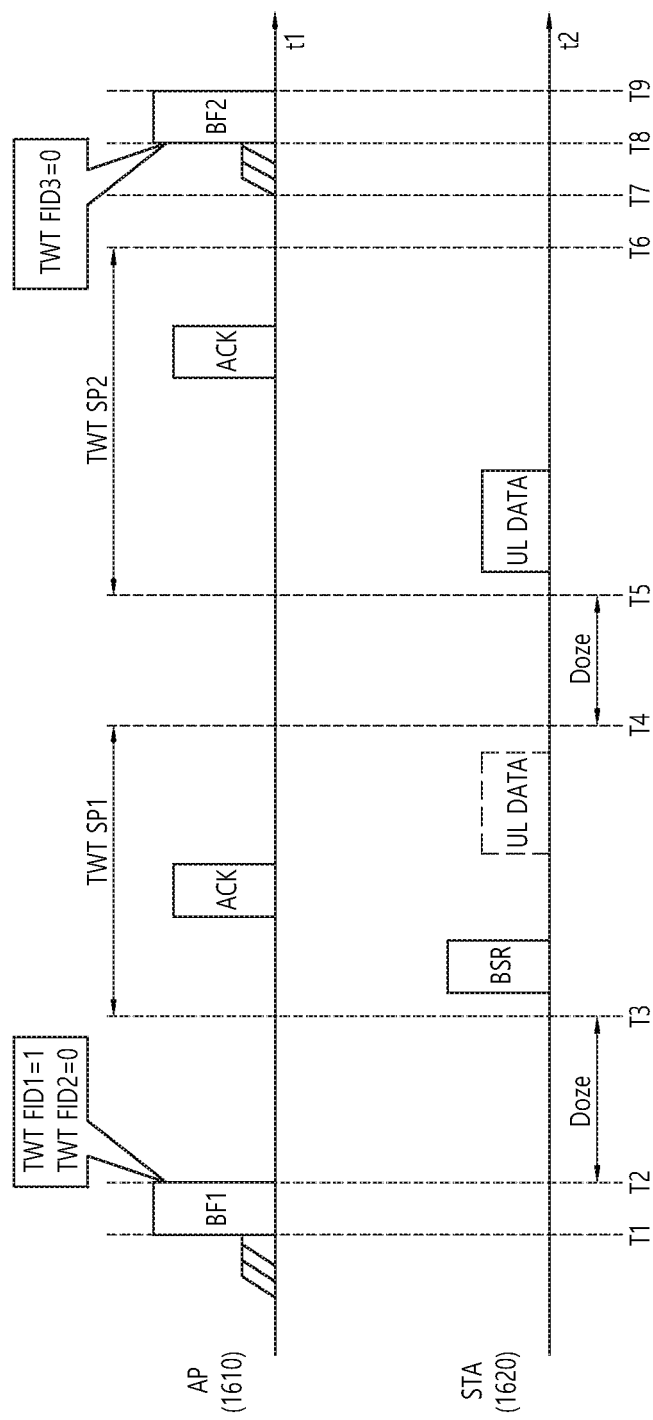
FIG. 16 illustrates another example showing a method for performing power management in a wireless LAN system according to an exemplary embodiment of the present invention.

FIG. 16 illustrates another example showing a method for performing power management in a wireless LAN system according to an exemplary embodiment of the present invention.

Referring to FIG. 12 to FIG. 16, a horizontal axis of the AP 1610 may indicate time t1 in the perspective of the AP, and a vertical axis of the AP 1610 may be related to the presence or absence of a frame that is being transmitted by the AP 1610. A horizontal axis of the STA 1620 may indicate time t2 in the perspective of the STA, and a vertical axis of the STA 1620 may be related to the presence or absence of a frame that is being transmitted by the STA 1620.

Referring to FIG. 1 to FIG. 16, a case when a plurality of TWT flow identifiers (TWT FID1, TWT FID2) for a plurality of TWT service periods (TWT SP1, TWT SP2) within a beacon interval T1 to T8 corresponding to the first beacon frame BF1 are each configured to have a different value is illustrated herein.

For simplicity and clarity in the description of FIG. 16, during a first period T1 to T2, the first beacon frame BF1, which is transmitted by the AP 1510, may include a plurality of TWT flow identifiers (TWT FID1, TWT FID2) each being assigned with a different value.

For example, the first TWT flow identifier (TWT FID1) for the first TWT service period (TWT SP1) may be set to '1'. And, the second TWT flow identifier (TWT FID2) for the second TWT service period (TWT SP2) may be set to '0'.

It shall be understood that descriptions for a second period T2 to T3 and a third period T3 to T4 of FIG. 16 may be substituted with the description of the second period T2 to T3 and the third period T3 to T4 of FIG. 15, which is presented above.

More specifically, a frame that can be transmitted during the first TWT service period (TWT SP1) T3 to T4 of FIG. 16 may be constrained (or limited) in accordance with the value ('1') of the first TWT flow identifier (TWT FID1). More specifically, the STA 1620 is incapable of transmitting an uplink data frame during the third period T3 to T4.

The STA 1620 may transmit an uplink data frame (UL data) during a fifth period T5 to T6, in which there is no constraint for the transmittable frames in accordance with the value ('0') of the second TWT flow identifier (TWT FID2).

In the related art, it was a general process to set the value of each of a plurality TWT flow identifiers in a beacon interval to have the same value. Unlike in the related art, the AP according to the exemplary embodiment of the present invention shown in FIG. 16 may transmit a beacon frame having each of a plurality of TWT flow identifiers for a plurality of TWT service periods within a beacon interval configured to have a different value.

Figure 17:
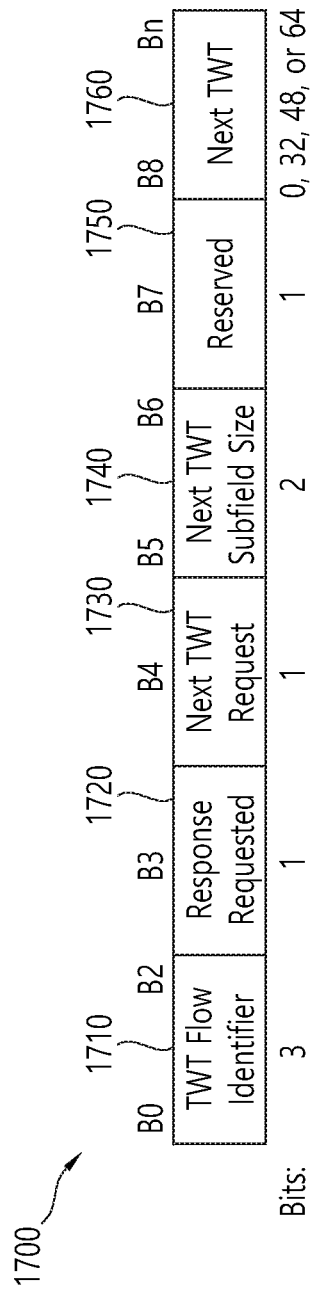
FIG. 17 illustrates an exemplary field of a TWT information frame according to an exemplary embodiment of the present invention.

FIG. 17 illustrates an exemplary field of a TWT information frame according to an exemplary embodiment of the present invention. A TWT information frame 1700 may include a plurality of fields 1710 to 1760.

Referring to FIG. 15 to FIG. 17, a TWT information (TWT info) frame 1700 shown in FIG. 17 may correspond to the TWT info frame, which is described above with reference to FIG. 15. A TWT flow identifier field 1710 may indicate 3 different types of TWT flow identifiers, as presented above in Table 1, based on 3 bits B0 to B2.

The TWT flow identifier field 1710 may include information for changing a TWT flow identifier (TWT FID) corresponding to a next TWT service period (TWT SP).

For example, the STA may receive a TWT info frame 1700 during a specific TWT service period. Even though a predetermined value exists for the TWT flow identifier (TWT FID) corresponding to the next TWT service period, the STA may update the TWT flow identifier (TWT FID) corresponding to the next TWT service period to the TWT flow identifier (TWT FID), which is included in the TWT info frame 1700.

A response request field 1720 may indicate whether or not to transmit a response frame by the STA, which has received the TWT info frame, based on 1 bit B3.

A next TWT request field 1730 may indicate whether or not the TWT info frame 1700 corresponds to a request for transmitting a next TWT field 1760.

A next TWT size field 1740 may indicate a size of the next TWT field 1760 based on 2 bits B5 to B6. In accordance with the 4 values being expressed by the 2 bits B5 to B6, the size of the next TWT field 1760 may be indicated as '0' bit, '32' bits, '48' bits, or '64' bits.

Based on its variable size, the next TWT field 1760 may include a value of the least significant portion of a TSF corresponding to the next TWT.

More detailed description of the TWT information frame may be provided by referring to Section 9.4.1.61 of the standard document IEEE P802.11 ah/D8.0, which was disclosed in April, 2016.

Figure 18:
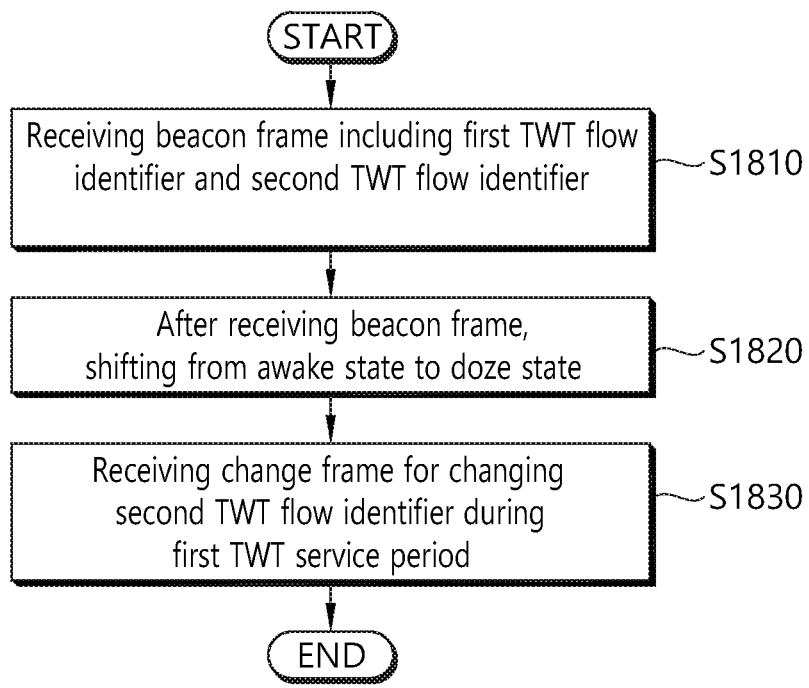
FIG. 18 illustrates a flow chart showing a method for performing power management in a wireless LAN system according to an exemplary embodiment of the present invention.

FIG. 18 illustrates a flow chart showing a method for performing power management in a wireless LAN system according to an exemplary embodiment of the present invention.

Referring to FIG. 1 to FIG. 18, in step S1810, a first wireless device (i.e., receiving STA) may receive a beacon frame including a first Target Wake Time (TWT) flow identifier and a second TWT flow identifier from a second wireless device.

The first TWT flow identifier may indicate a type of a first recommendation frame, which is authorized to be transmitted during a first Target Wake Time (TWT) service period. The second TWT flow identifier may indicate a type of a second recommendation frame, which is authorized to be transmitted during a second Target Wake Time (TWT) service period.

Referring to Table 1, which is presented above, the first TWT flow identifier (or second TWT flow identifier) may be configured to have any one of a first value, a second value, and a third value. For example, the first TWT flow identifier corresponding to the first value may indicate that frames of all types may be transmitted by the first wireless device during the first TWT service period (TWT SP1).

For example, the first TWT flow identifier (or second TWT flow identifier) corresponding to the second value may indicate that, with the exception for a frame related to an OFDMA random access procedure, a Power-Save (PS) Poll frame, a Quality of Service (QoS) null frame, a frame related to sounding feedback, and a management frame may be transmitted by the first wireless device during the first TWT service period (TWT SP1).

For example, the first TWT flow identifier (or second TWT flow identifier) corresponding to the third value may indicate that, in addition to a frame related to an OFDMA random access procedure, a Power-Save (PS) Poll frame, a Quality of Service (QoS) null frame, a frame related to sounding feedback, and a management frame may be transmitted by the first wireless device during the first TWT service period (TWT SP1).

According to an exemplary embodiment of the present invention, the first wireless device may maintain its awake state during the first TWT service period and the second TWT service period. The first TWT service period corresponding to the first TWT flow identifier and the second TWT service period corresponding to the second TWT flow identifier may correspond to periods according to the broadcast scheme. The second TWT flow identifier may be configured to have the same value as the first TWT flow identifier.

In step S1820, the first wireless device, which has received the beacon frame, may be shifted from an awake state to a doze state.

For example, a wireless device operating in the awake state may receive a frame being transmitted from another wireless device or may transmit a frame to another wireless device. Conversely, a wireless device operating in the doze state is incapable of receiving a frame being transmitted from another wireless device and is also incapable of transmitting a frame to another wireless device.

In step S1830, the first wireless device may receive a change frame for changing the second TWT flow identifier from the second wireless device during the first TWT service period.

For example, a case when an uplink frame, which is buffered to the first wireless device for the second wireless device, does not correspond to the type of first recommendation frame according to the first TWT flow identifier (e.g., referring to Table 1, a case when the TWT FID is set to '1') may be assumed herein.

Additionally, it may also be assumed that the uplink frame, which is buffered to the first wireless device, corresponds to a QoS data frame. In this case, the first wireless device may not transmit the uplink frame during the first TWT service period.

For example, the second wireless device may update the second TWT flow identifier corresponding to the second TWT service period in accordance with the received change frame. More specifically, referring to Table 1, a case when the pre-determined TWT FID (e.g., wherein the TWT FID is set to '1') is updated in accordance with the change frame (e.g., a case when the TWT FID is updated to '0') is assumed herein.

Additionally, an uplink frame that is buffered for the second wireless device may correspond to a second recommendation frame type corresponding to the second TWT flow identifier, which is updated in accordance with the change frame. In this case, the first wireless device may transmit an uplink frame during the second TWT service period.

Although the description of the exemplary embodiment of the present invention is presented based on one first wireless device and one second wireless device, it shall be understood that the description of the exemplary embodiment of the present invention may also be extended to a plurality of first wireless devices and a plurality of second wireless devices and applied accordingly.

When transmitting the related art beacon frame, a TWT service flow corresponding to each TWT service period may be determined (i.e., the type of frames that can be transmitted during each TWT service period may be determined). However, for an efficient power management of the wireless LAN system, a change in the TWT service flow corresponding to a next TWT service period may be requested.

According to the exemplary embodiment of the present invention, the TWT service flow corresponding to the next TWT service period may be dynamically changed based on the change frame, which is received from the AP. Accordingly, in the aspect of power management, a wireless LAN system having a more enhanced performance may be provided.

Figure 19:
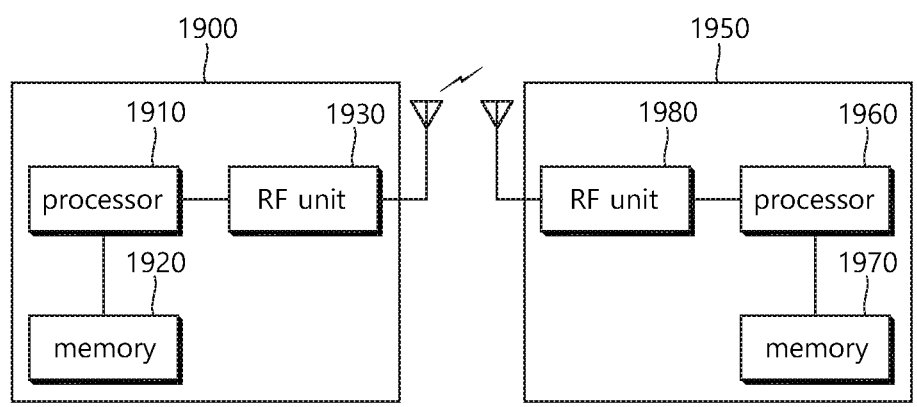
FIG. 19 illustrates a block view showing a wireless device to which the exemplary embodiment of the present invention can be applied.

FIG. 19 is a block view illustrating a wireless device to which the exemplary embodiment of the present invention can be applied.

Referring to FIG. 19, as an STA that can implement the above-described exemplary embodiment, the wireless device may correspond to an AP or a non-AP station (STA). The wireless device may correspond to the above-described user or may correspond to a transmitting device transmitting a signal to the user.

The AP 1900 includes a processor 1910, a memory 1920, and a radio frequency (RF) unit 1930.

The RF unit 1930 is connected to the processor 1910, thereby being capable of transmitting and/or receiving radio signals.

The processor 1910 implements the functions, processes, and/or methods proposed in the present invention. For example, the processor 1910 may be implemented to perform the operations according to the above-described exemplary embodiments of the present invention. More specifically, among the operations that are disclosed in the exemplary embodiments of FIG. 1 to FIG. 18, the processor 1910 may perform the operations that may be performed by the AP.

The non-AP STA 1950 includes a processor 1960, a memory 1970, and a radio frequency (RF) unit 1980.

The RF unit 1980 is connected to the processor 1960, thereby being capable of transmitting and/or receiving radio signals.

The processor 1960 implements the functions, processes, and/or methods proposed in the present invention. For example, the processor 1960 may be implemented to perform the operations of the non-AP STA according to the above-described exemplary embodiments of the present invention. The processor may perform the operations of the non-AP STA, which are disclosed in the exemplary embodiments of FIG. 1 to FIG. 18.

The processor 1910 and 1960 may include an application-specific integrated circuit (ASIC), another chip set, a logical circuit, a data processing device, and/or a converter converting a baseband signal and a radio signal to and from one another. The memory 1920 and 1970 may include a read-only memory (ROM), a random access memory (RAM), a flash memory, a memory card, a storage medium, and/or another storage device. The RF unit 1930 and 1980 may include one or more antennas transmitting and/or receiving radio signals.

When the exemplary embodiment is implemented as software, the above-described method may be implemented as a module (process, function, and so on) performing the above-described functions. The module may be stored in the memory 1920 and 1970 and may be executed by the processor 1910 and 1960. The memory 1920 and 1970 may be located inside or outside of the processor 1910 and 1960 and may be connected to the processor 1910 and 1960 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for performing power management in a wireless local area network (WLAN) system, the method comprising:

receiving, by a first wireless device in an awake state, a beacon frame including a first time wake time (TWT) flow identifier (TWT FID) information for a first TWT service period and a second TWT FID information for a second TWT service period from a second wireless device, wherein the first TWT FID information is related to a plurality of first recommendation frames that are allowed to be transmitted during the first TWT service period, and wherein the second TWT FID information is related to a plurality of second recommendation frames that are allowed to be transmitted during the second TWT service period;

transitioning, by the first wireless device, from the awake state to a doze state after receiving the beacon frame;

transitioning, by the first wireless device, from the doze state to the awake state when the first TWT service period begins;

transmitting, by the first wireless device in the awake state, a first uplink frame to the second wireless device during the first TWT service period, wherein the first uplink frame is related to one of the plurality of first recommendation frames; and receiving, by the first wireless device in the awake state, a TWT information frame from the second wireless device during the first TWT service period, wherein the TWT information frame includes operation information for updating the second TWT FID information, and wherein the operation information is generated based on the first uplink frame.

2. The method of claim 1, wherein the first TWT FID information is configured to have any one of a first value related to all types of frames being allowed for transmission, a second value related to, with an exception for a frame related to an Orthogonal Frequency-Division Multiple Access (OFDMA) random access procedure, a Power-Save (PS) Poll frame, a Quality of Service (QoS) null frame, a frame related to sounding feedback, and a management frame being allowed for transmission, and a third value related to, in addition to the frame related to the OFDMA random access procedure, the PS Poll frame, the QoS null frame, the frame related to the sounding feedback, and the management frame being allowed for transmission.

3. The method of claim 1, wherein the second TWT FID information is configured to have any one of a first value related to all types of frames being allowed for transmission, a second value related to, with an exception for a frame related to an Orthogonal Frequency-Division Multiple Access (OFDMA) random access procedure, a Power-Save (PS) Poll frame, a Quality of Service (QoS) null frame, a frame related to sounding feedback, and a management frame being allowed for transmission, and a third value related to, in addition to the frame related to the OFDMA random access procedure, the PS Poll frame, the QoS null frame, the frame related to the sounding feedback, and the management frame being allowed for transmission.

4. The method of claim 1, wherein the second TWT FID information is configured to have a same value as the first TWT FID information.

5. The method of claim 1, wherein the first wireless device maintains the awake state during the first TWT service period and the second TWT service period.

6. The method of claim 1, further comprising:
updating, by the first wireless device, the second TWT FID information based on the TWT information frame.

7. The method of claim 6, further comprising:
transmitting, by the first wireless device, a second uplink frame during the second TWT service period,
wherein the second uplink frame is related to one of the plurality of second recommendation frames.

8. The method of claim 1, wherein the first TWT service period and the second TWT service period are applied to a broadcast scheme.

9. A first wireless device using a method for performing power management in a wireless LAN system, the first wireless device comprising:
a transceiver transmitting and/or receiving radio signals; and
a processor being operatively connected to the transceiver,
wherein the processor is configured:
to receive a beacon frame including a first time wake time (TWT) flow identifier (TWT FID) information for a first TWT service period and a second TWT FID information for a second TWT service period from a second wireless device,
wherein the first TWT FID information is related to a plurality of first recommendation frames that are allowed to be transmitted during the first TWT service period, and
wherein the second TWT FID information is related to a plurality of second recommendation frames that are allowed to be transmitted during the second TWT service period;
to transition from the awake state to a doze state after receiving the beacon frame;
to transition from the doze state to the awake state when the first TWT service period begins;
to transmit a first uplink frame to the second wireless device during the first TWT service period,
wherein the first uplink frame is related to one of the plurality of first recommendation frames; and
to receive a TWT information frame from the second wireless device during the first TWT service period,
wherein the TWT information frame includes operation information for updating the second TWT FID information, and
wherein the operation information is generated based on the first uplink frame.

10. The method of claim 1, wherein the first uplink frame is a buffer status report (BSR) frame related to an amount of uplink traffic buffered by the first wireless device.

* * * * *